United States Patent [19]

Wick

[11] B 4,001,170

[45] Jan. 4, 1977

[54] PROCESS FOR BULK DYEING HIGH MOLECULAR ORGANIC COMPOUNDS

[75] Inventor: Arnold Wick, Therwil, Switzerland

[73] Assignee: Ciba-Geigy Corporation, Ardsley, N.Y.

[22] Filed: July 1, 1974

[21] Appl. No.: 485,188

[44] Published under the second Trial Voluntary Protest Program on March 16, 1976 as document No. B 485,188.

[30] Foreign Application Priority Data

July 4, 1973 Switzerland .................. 9769/73

[52] U.S. Cl. ..................... 260/40 P; 260/37 P; 260/256.4 Q
[51] Int. Cl.$^2$ .................................... C08K 5/35
[58] Field of Search .......... 260/40 P, 37 P, 256.4 Q

[56] References Cited

UNITED STATES PATENTS 3,730,955   5/1973   Jaffe .................. 260/256.4 Q

FOREIGN PATENTS OR APPLICATIONS 1,170,899   11/1969   United Kingdom ........ 260/256.4 Q

*Primary Examiner*—Donald E. Czaja
*Assistant Examiner*—S. M. Person
*Attorney, Agent, or Firm*—Vincent J. Cavalieri

[57] ABSTRACT

Process for bulk dyeing high molecular organic compounds, by using anthrapyrimidines of the formula

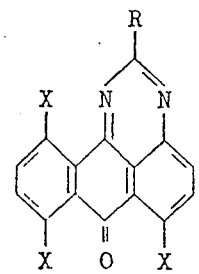

as dyestuffs, wherein R denotes a hydrogen atom, an alkyl group or an aromatic radical, one X denotes an arylamino group, or a phenylthio group which is optionally substituted by 1–2 halogen atoms or alkyl groups containing 1–4 carbon atoms, and the other X denotes hydrogen atoms, and X must not be a benzophenonylamino group if R denotes a hydrogen atom.

6 Claims, No Drawings

PROCESS FOR BULK DYEING HIGH MOLECULAR ORGANIC COMPOUNDS

It has been found that anthrapyrimidines of the formula

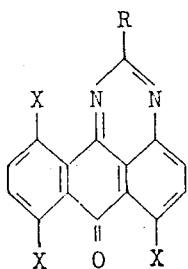

(I)

wherein R denotes a hydrogen atom, an alkyl group or an aromatic radical, one X denotes an arylamino group or a phenylthio group which is optionally substituted by 1–2 halogen atoms or alkyl groups containing 1–4 carbon atoms, and the other X denotes hydrogen atoms, and X must not be a benzophenonylamino group if R denotes a hydrogen atom, are outstandingly suitable for the bulk dyeing of high molecular organic compounds.

Compounds of particular interest are those of the formula (I) wherein R denotes an aryl radical, particularly a benzene or naphthalene radical, and X denotes an aryl radical which is at the most tricyclic.

Particular preference attaches to anthrapyrimidines which are distinguished, as a rule, by particularly clear colour shades and which correspond to the formula

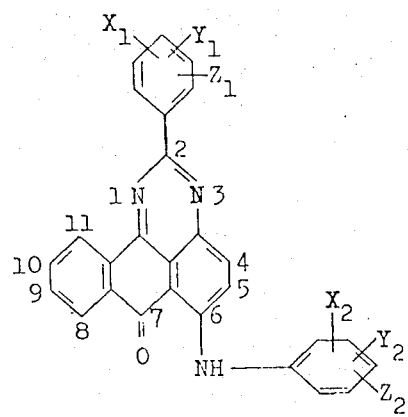

wherein $X_1$ denotes a hydrogen or halogen atom, an alkyl group containing 1–6 carbon atoms, or a phenyl or benzoyl group, $Y_1$ and $Z_1$ denote hydrogen or halogen atoms or alkyl groups containing 1–6 carbon atoms, $X_2$ denotes a hydrogen or halogen atom, an alkyl or alkoxy group containing 1–6 carbon atoms, or a phenyl, phenylsulphonyl, phenoxy, phenylamino, benzoylamino or nitrile group, and $Y_2$ and $Z_2$ denote hydrogen or halogen atoms or alkyl groups containing 1–6 carbon atoms, or wherein the $X_2$ and $Y_2$ groups form a fused benzene ring. Such compounds are known and can be obtained by known processes, for example by condensing a 4-, 6- or 8-halogeno-2-arylanthrapyrimidine with an aromatic amine, especially an aminobenzene.

The following halogeno-2-arylanthrapyrimidines may be mentioned: 6-, 8- or 11-chloro-2-phenylanthrapyrimidine, 6-, 8- or 11-chloro-2-(2'-toluyl)-anthrapyrimidine, 6-, 8- or 11-chloro-2-(3'-toluyl)-anthrapyrimidine, 6-, 8- or 11-chloro-2-(4'-toluly)-anthrapyrimidine, 6-, 8- or 11-chloro-2-(2'-chlorophenyl)-anthrapyrimidine, 6-, 8- or 11-chloro-2-(3'-chlorophenyl)-anthrapyrimidine, 6-, 8- or 11-chloro-2-(4'-chlorophenyl)-anthrapyrimidine, 6-, 8- or 11-chloro-2-(2', 4'-dichlorophenyl)-anthrapyrimidine, 6-, 8- or 11-chloro-2-(2', 5'-dichlorophenyl)-anthrapyrimidine, 6-, 8- or 11-chloro-2-(4'-diphenylyl)-anthrapyrimidine, 6-, 8- or 11-chloro-2-(4'-benzoylphenyl)-anthrapyrimidine, 6-, 8- or 11-chloro-2-(1'-naphthyl)-anthrapyrimidine and 6-, 8- or 11-chloro-2-(2'-naphthyl)-anthrapyrimidine.

The following aromatic amines may be mentioned: Aniline, 2-, 3- or 4-methylaniline, 2-ethylaniline, 4-tert. butylaniline, 4-methoxyaniline, 4-ethoxyaniline, 2,3-, 2,4-, 2,5-, 2,6-, 3,4- or 3,5-dimethylaniline, 2,4,5- or 2,4,6-trimethylaniline, 3- or 4-chloroaniline, 2,3-, 2,4-, 2,5-, 3,4- or 3,5-dichloroaniline, 3-trifluoromethylaniline, 2- or 4-aminobenzonitrile, 2-, 3- or 4-aminobenzoic acid methyl ester, 2- or 4-methylsulphonylaniline, 4-aminodiphenyl, 4-aminodiphenylmethane, 4-aminodiphenyl ether, 4-aminodiphenyl sulphide, 4-aminodiphenylamine, 4-aminodiphenylsulphone, 4-aminodiphenylketone, monobenzoyl-1,4- or 1,3-phenylenediamine, 1-aminoanthraquinone, 1-amino-3-chloroanthraquinone, 1-amino-4-, 5- or 8-benzoylaminoanthraquinone, 6-, 8- or 11-aminoanthrapyrimidine or one of the amino-2-arylanthrapyrimidines mentioned below.

The anthrapyrimidines to be used according to the invention can also be obtained by condensing a 4-, 6- or 8- amino-2-arylanthrapyrimidine with an aryl compound containing an active halogen atom, in the presence of an acid-binding agent and a copper catalyst in a high-boiling organic solvent, such as nitrobenzene. The following examples of amino-2-arylanthrapyrimidines may be mentioned: 6- or 8-amino-2-phenylanthrapyrimidine, 6- or 8-amino-2-(4'-toluyl)-anthrapyrimidine, 6- or 8-amino-2-(4'-chlorophenyl)-anthrapyrimidine and 6- or 8-amino-2-(4'-diphenylyl)-anthrapyrimidine.

The following examples of aryl compounds containing an active halogen may be mentioned: 1,2-dichlorobenzene, 1,2,4-trichlorobenzene, 2,4- or 2,5-dichlorobromobenzene, 4-bromodiphenyl, 4-bromodiphenyl ether, 1-chloroanthraquinone, 2-bromoanthraquinone, 1-chloro-4- or -5-benzoylaminoanthraquinone, 3-bromo-benzanthrone or one of the abovementioned halogeno-2-arylanthrapyrimidines.

The anthrapyrimidines, to be used according to the invention, of the formula

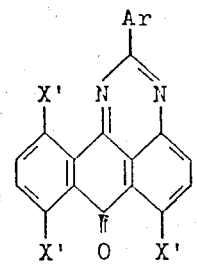

(III)

wherein Ar has the meaning indicated and one X' denotes a group of the formula —NHA, wherein A is represented by an anthraquinoidal radical, and the other X' denotes hydrogen atoms, are new compounds. They are obtained by both of the abovementioned processes, that is to say by condensing an amino-2-arylanthrapyrimidine of the formula

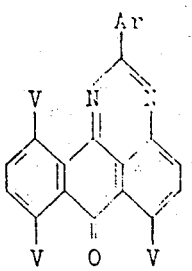

(IV)

especially an amino-2-arylanthrapyrimidine of the formula

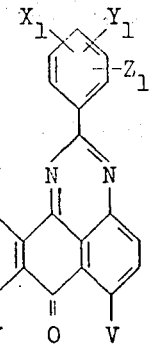

(V)

with a compound of the formula $$A - V \qquad (VI)$$

especially a compound of the formula

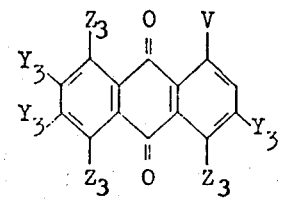

(VII)

wherein, in the formulae IV–VI, Ar, $X_1$, $Y_1$ and $Z_1$ have the meaning indicated, one $Y_3$ denotes a chlorine atom and the remainder denote H atoms, one $Z_3$ denotes an alkanoylamino group or a benzoylamino group and the other $Z_3$ denotes hydrogen atoms, and V denotes a chlorine or bromine atom or an amino group, the components being selected in such a way that V denotes an amino group in one component and denotes a chlorine or bromine atom in the other component.

The anthrapyrimidines thus obtained are in part valuable pigments which are distinguished by an outstanding stability to heat and by good fastness to light and migration, and in part are soluble colouring substances which are distinguished by excellent stability to heat and fastness to light.

The following may be mentioned as examples of high molecular organic compounds which can be dyed by means of the dyestuffs according to the invention: Cellulose ethers and esters, such as ethylcellulose, nitrocellulose, cellulose acetate or cellulose butyrate, polyamides or polyurethanes or polyesters, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene or polypropylene, polyacrylonitrile, and polyacrylic acid esters, rubber, casein, silicone and silicone resins, individually or as mixtures.

In this it is immaterial whether the high molecular compounds mentioned are present as plastic compositions or melts or are in the form of spinning solutions, lacquers, paints or printing inks.

In the case of those of the colorants according to the invention which are pigments, it is advisable, before their incorporation into the high molecular compounds, to convert them, in the presence of salts, into a finely divided form, for example by means of suitable mechanical treatment, for example grinding or kneading. Pigment preparations can also be used instead of the pure pigments.

Those of the colorants according to the invention which are soluble in organic media, are preferentially suitable for the bulk dyeing of polymers which can be spun, for example polyolefines or, particularly, linear polyesters.

Mixtures of two or more of the colorants according to the invention can often be used with advantage instead of unitary colouring matters.

Linear polyesters which may be mentioned are especially those which are obtained by polycondensation of terephthalic acid, or esters thereof, with glycols of the formula HO—(CH$_2$)$_n$—OH, wherein n denotes the number 2 - 10, or with 1,4-di(hydroxymethyl)-cyclohexane, or by polycondensation of glycol ethers of hydroxybenzoic acids, for example p-(β-hydroxyethoxy)-benzoic acid. The term linear polyesters also includes copolymers obtained by partial replacement of the terephthalic acid by another dicarboxylic acid or by a hydroxycarboxylic acid, and/or by partial replacement of the glycol by another diol.

However, the polyethylene terephthalates are of especial interest.

The linear polyesters to be dyed, suitably in the form of powders, chips or granules, are intimately mixed with the dyestuff. This can be carried out, for example, by dusting the polyester particles with the finely divided, dry dyestuff powder or by treating the polyester particles with a solution or dispersion of the dyestuff in an organic solvent and subsequent removal of the solvent.

Finally, the substance used for dyeing can also be added directly to the fused polyester, or can also be added before or during the polycondensation of the polyethylene terephthalate.

Depending on the depth of colour desired, the ratio of dyestuff to polyester can vary within wide limits. In general, it is advisable to use 0.01 - 2 parts of dyestuff to 100 parts of polyester.

The polyester particles treated in this way are fused in an extruder according to known processes and are pressed into objects such as films and, particularly, fibres, or are cast into sheets.

Objects which are uniformly and intensively dyed and which have a high fastness to light are obtained. The dyed fibres which can be obtained in accordance with the process are distinguished, in addition, by an outstanding fastness to wet cleaning and dry cleaning.

A particular advantage of the dyestuffs to be used in accordance with the invention consists of the fact that they dissolve in the polyester melt and withstand surprisingly high temperatures, up to 300°C, without decomposition, so that significantly clearer dyeings are obtained than when using insoluble pigments.

In the following examples, unless otherwise specified, the parts denote parts by weight and the percentages denote percentages by weight.

PREPARATION OF THE DYESTUFFS USED

EXAMPLE 1

A mixture of 34.3 parts of 2-phenyl-6-chloroanthrapyrimidine, 24 parts of 1-aminoanthraquinone, 15 parts of sodium bicarbonate, 0.5 part of copper powder and 0.5 part of copper-I chloride in 500 parts of nitrobenzene is stirred under reflux for 4 hours. After cooling, the crystalline dyestuff which has precipitated is filtered off, washed successively with a little nitrobenzene, then with warm alcohol and finally with hot water, and dried in vacuo at 80° - 90°C. 46 parts are obtained of the anthrimide of the formula

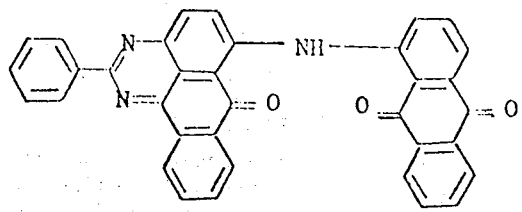

which dyes polyesters in bulk according to the specifications of Example 43, in brilliant, red shades of excellent fastness properties.

The same colouring substance is obtained if 6-amino-2-phenylanthrapyrimidine is condensed analogously with 1-chloroanthraquinone.

Analogous colouring substances are obtained if the following halogeno- or amino-2-arylanthrapyrimidines are condensed with the amino compounds or halogen compounds indicated:

| Example | Anthrapyrimidine component | Condensation component | Shade in polyester |
|---|---|---|---|
| 2 | 6-Chloro-2-phenylanthrapyrimidine | 1-Amino-3-chloroanthraquinone | Red |
| 3 | " | 1-Amino-5-benzoylamino-anthraquinone | Red |
| 4 | " | Aniline | Orange |
| 5 | " | 4-Toluidine | Orange |
| 6 | " | 4-Chloroaniline | Orange |
| 7 | " | Anisidine | Red |
| 8 | " | 4-Aminodiphenyl ether | Red |
| 9 | 8-Chloro-2-phenylanthrapyrimidine | 1-Aminoanthraquinone | Red |
| 10 | 11-Chloro-2-phenylanthrapyrimidine | 1-Aminoanthraquinone | Violet-red |
| 11 | " | 1-Amino-3-chloroanthraquinone | Red |
| 12 | 6-Amino-2-(4-toluyl)-anthrapyrimidine | 1-Chloroanthraquinone | Red |
| 13 | 8-Amino-2-(4-toluyl)-anthrapyrimidine | 1-Chloroanthraquinone | Red |

| Example | Anthrapyrimidine component | Condensation component | Shade in polyester |
|---|---|---|---|
| 14 | " | 1,2,4-Trichlorobenzene | Red |
| 15 | 6-Amino-2-(4-chlorophenyl)-anthrapyrimidine | 1-Chloroanthraquinone | Red |
| 16 | 8-Chloro-2-(2-chlorophenyl)-anthrapyrimidine | 1-Aminoanthraquinone | Claret |
| 17 | 8-Chloro-2-(4-chlorophenyl)-anthrapyrimidine | 1-Aminoanthraquinone | Claret |
| 18 | 6-Chloro-2-(2,5-dichlorophenyl)-anthrapyrimidine | 1-Aminoanthraquinone | Brown |
| 19 | 8-Chloro-2-(2,5-dichlorophenyl)-anthrapyrimidine | 1-Aminoanthraquinone | Claret |
| 20 | 6-Chloro-2-(2,4-dichlorophenyl)-anthrapyrimidine | 1-Aminoanthraquinone | Brown |
| 21 | 8-Chloro-2-(2,4-dichlorophenyl)-anthrapyrimidine | 1-Aminoanthraquinone | Red |
| 22 | 6-Chloro-2-(1-naphthyl)-anthrapyrimidine | 1-Aminoanthraquinone | Red |
| 23 | 8-Chloro-2-(2-naphthyl)-anthrapyrimidine | 1-Aminoanthraquinone | Red |
| 24 | 6-Chloro-2-(4-benzoylphenyl)-anthrapyrimidine | 1-Aminoanthraquinone | Red |
| 25 | 6-Chloro-2-(4-diphenyl)-anthrapyrimidine | 1-Aminoanthraquinone | Red |
| 26 | " | Aniline | Red |
| 27 | " | 4-Toluidine | Red |
| 28 | " | Anisidine | Red |
| 29 | " | 4-Chloroaniline | Orange |
| 30 | " | 4-Aminodiphenyl ether | Red |
| 31 | " | 2,4-Dimethylaniline | Red |
| 32 | " | 2,6-Dimethylaniline | Yellow-brown |
| 33 | " | Mesidine | Yellow-Brown |
| 34 | " | 4-Ethylaniline | Red |
| 35 | " | 2,4-Dichloroaniline | Orange |
| 36 | " | 4-Ethoxyaniline | Red |
| 37 | 6-Chloro-2-phenylanthrapyrimidine | 2,4-Dimethylaniline | Red |
| 38 | " | 2,6-Dimethylaniline | Yellow |
| 39 | " | Mesidine | Yellow |
| 40 | " | 4-Ethylaniline | Red |
| 41 | " | 2,4-Dichloroaniline | Orange |
| 42 | " | 4-Ethoxyaniline | Red |
| 43 | 6-Chloroanthrapyrimidine | 4-Aminodiphenyl ether | Red-brown |
| 44 | " | 4-Chloroaniline | Yellow-brown |
| 45 | " | 2,4-Dimethylaniline | Red-brown |
| 46 | 8-Chloro-2-(4'-chlorophenyl)-anthrapyrimidine | 4-Chloroaniline | Claret |
| 47 | 6-Chloro-2-(4'-benzoylphenyl)-anthrapyrimidine | Aniline | Orange |
| 48 | 6-Chloro-2-(4'-toluyl)-anthrapyrimidine | 4-Toluidine | Red |

EXAMPLE 49

21 g of 6-chloro-2-(4-diphenyl)-anthrapyrimidine (obtained by reacting 1-amino-4-chloroanthraquinone with diphenyl-4-carboxylic acid N-methylamide in the presence of thionyl chloride (in accordance with D.R.P. 566,474)) are condensed, in accordance with Example 1, in 250 parts of nitrobenzene in the presence of 7.5 parts of sodium carbonate and 0.25 part of copper-1 chloride with 13.5 parts of 1-amino-3-chloroanthraquinone. 28 parts are obtained of the anthrimide of the formula Analogous pigments are obtained if the following components are condensed with one another in accordance with Example 49:

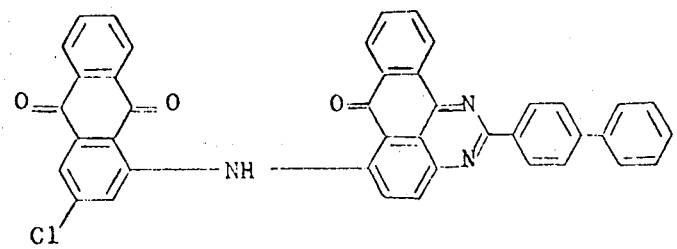

| Example | Anthrapyrimidine component | Condensation component | Shade in PVC |
|---|---|---|---|
| 50 | 6-Chloro-2-(4-diphenyl)-anthrapyrimidine | 1-Amino-5-benzoylamino-anthraquinone | Claret |
| 51 | " | 8-Amino-2-phenylanthrapyrimidine | Bluish-tinged red |
| 52 | 8-Chloro-2-(4-diphenyl)-anthrapyrimidine | 6-Amino-2-phenylanthrapyrimidine | Brown |
| 53 | 6-Amino-2-(4-diphenyl)-anthrapyrimidine | 5-Chloroanthrapyrimidine | Claret |
| 54 | 6-Amino-2-phenylanthrapyrimidine | 8-Chloro-2-phenylanthrapyrimidine | Brown ⎫ Identical |
| 55 | 8-Amino-2-phenylanthrapyrimidine | 6-Chloro-2-phenylanthrapyrimidine | Brown ⎭ |
| 56 | 6-Amino-2-phenylanthrapyrimidine | 4-Bromo-2-phenylanthra- | Violet |

-continued

| Example | Anthrapyrimidine component | Condensation component | Shade in PVC |
|---------|---------------------------|------------------------|--------------|
| 57 | 8-Amino-2-phenylanthrapyrimidine | pyrimidine " | Violet |

Use examples

EXAMPLE 58

65 parts of stabilised polyvinyl chloride, 35 parts of dioctyl phthalate and 0.2 part of the pigment colorant obtained according to Example 49, converted into a finely divided form by grinding with sand and are stirred together and are then worked on a twin-roll calender for 7 minutes at 140°C. A film, coloured a brilliant red and of good fastness to migration and outstanding fastness to light, is obtained.

EXAMPLE 59

If the procedure of Example 50 is followed, but in addition 5 parts of titanium dioxide are admixed, a delustred, red film of similarly good properties is obtained.

EXAMPLE 60

99 parts of isotactic polypropylene granules are mixed with 0.5 part of the pigment according to Example 49 and the mixture is processed at 240° – 280°C in an injection moulding machine. A red-coloured injection moulding of good fastness to light is obtained.

The pigment displays an outstanding heat stability if exposed to thermal treatment for 10 minutes at 240°C, 260°C and 280°C.

EXAMPLE 61

Non-delustred polyethylene terephthalate granules, suitable for the manufacture of fibre, are shaken, in a vessel which can be closed, together with 1% of 2-phenyl-6-anilinoanthrapyrimidine for 15 minutes on a shaking machine. The uniformly coloured granule particles are spun, on a meltspinning apparatus (250°C ± 3°C, approx. 5 minutes residence time in the spinning machine), into filaments which are stretched on a stretch-and-twist installation and are wound up. As a result of the solubility of the dyestuff in polyethylene terephthalate, brilliant, orange dyeings are obtained which, after thermofixing treatment of the dyed-material, are distinguished by outstanding fastness to light, excellent fastness to washing, dry cleaning, cross-dyeing and sublimation, and high resistance to chlorite bleaching and very good fastness to rubbing.

EXAMPLE 62

10 g of titanium dioxide and 2 g of pigment prepared according to Example 49 are ground in a ball-mill for 48 hours with a mixture of 26.4 g of coconut-alkyd resin, 24.0 g of melamine-formaldehyde resin (50% solids content), 8.8 g of ethylene glycol monomethyl ether and 28.8 g of xylene.

If this lacquer is sprayed onto an aluminium foil, pre-dried for 30 minutes at room temperature and then stoved at 120°C for 30 minutes, a clear, red lacquer finish is obtained which has a good depth of colour and is distinguished by good fastness to overlacquering, outstanding fastness to light and good fastness to weathering.

Lacquer finishes with similar properties are obtained if the following pigments are applied in accordance with Example 62.

| Example No. | Pigment | Shade |
|-------------|---------|-------|
| 63 | Pigment according to Example 32 | Claret |
| 64 | Pigment according to Example 34 | Brown |
| 65 | Pigment according to Example 35 | Claret |
| 66 | Pigment according to Example 37 | Brown |
| 67 | Pigment according to Example 39 | Violet |

EXAMPLE 68

1,000 parts of polyethylene terephthalate granules, 10 parts of titanium oxide (Kronos RN 40) and 1 part of the dyestuff according to Example 1 are mixed in a closed vessel on a roller stand for 2 hours. The dyed granules are extruded at approx. 260°C into strands of 2 mm diameter and are once more granulated. The resulting granules are injection moulded at 270°–280°C in an Anker screw injection moulding machine. A delustred, red-coloured moulding of very good light stability is obtained.

EXAMPLE 69

8.4 parts of 2-methyl-6-chloroanthrapyrimidine in 50 parts of aniline are stirred for 4 hours at 175-180°C in the presence of 4 parts of sodium carbonate and 0.1 part of copper-I chloride. After cooling, the reaction product, which successively with precipitated as orange crystals, is separated off and washed successively with cold nitrobenzene, alcohol, 5% strength hydrochloric acid and water and dried in vacuo at 90°C. This gives, in an analytically pure form, 2-methyl-6-anilinoanthrapyrimidine, which dyes polyester in bulk in orange shades:

| Calculated | C 78.32 | H 4.48 | N 12.46% |
| Found | C 78.1 | H 4.5 | N 12.5% |

The starting material required for the synthesis was prepared by condensing 1-amino-4-chloroanthraquinone at reflux temperature with an excess of acetonitrile, in the presence of double the molar quantity of aluminium chloride. The crude product obtained in this way was purified by fractional precipitation from concentrated sulphuric acid and subsequent vacuum sublimation and recrystallisation from dimethylformamide, and 2-methyl-6-chloroanthrapyrimidine was obtained in an analytically pure form as small yellow rods of melting point 236°C:

| Calculated | C 68.46 | H 3.23 | Cl 12.63 | N 9.98 |
| Found | C 68.5 | H 3.4 | Cl 12.9 | N 9.8 |

EXAMPLE 70

A solution of 40 parts of potassium hydroxide in 60 parts of water is added to a solution of 66 parts of thiophenol in 1,000 parts of dimethylformamide and 171 parts of 2-phenyl-6-chloroanthrapyrimidine are then introduced. The mixture is stirred for 16 hours at room temperature and afterwards for a further hour at 50°–60°C. After cooling to room temperature, the colorant, which has precipitated in orange crystalline platelets, is filtered off, washed with DMF and alcohol and dried at 80°–90°C in vacuo. 194 parts (93.2% of theory) are obtained of 2-phenyl-6-phenylmercaptoanthrapyrimidine, which dyes polyester in bulk in fast, yellow shades.

The phenylmercaptoanthrapyrimidines listed below are obtained in an analogous manner:

| Example | Phenylmercaptoanthrapyrimidine | Shade in polyester |
|---|---|---|
| 71 | 2-(4'-Diphenyl)-6-phenylmercapto-anthrapyrimidine | Yellow |
| 72 | 6-Phenylmercaptoanthrapyrimidine | Olive-yellow |
| 73 | 2-Phenyl-6-(2',5'-dichlorophenyl-anthrapyrimidine | Greenish-tinged yellow |
| 74 | 2-Phenyl-6-(2'-methyl-4'-chloro-phenylmercapto)-anthrapyrimidine | Yellow |
| 75 | 2-Phenyl-8-(4'-ethylphenylmercapto)-anthrapyrimidine | Yellow |
| 76 | 2-(1'-Naphthyl)-8-phenylmercapto-anthrapyrimidine | Yellow |
| 77 | 2-(4'-Diphenyl)-8-phenylmercapto-anthrapyrimidine | Yellow |
| 78 | 8-Phenylmercaptoanthrapyrimidine | Yellow |
| 79 | 2-Methyl-6-phenylmercaptoanthra-pyrimidine | Yellow |
| 80 | 2-(4'-Toluyl)-6-phenylmercapto-anthrapyrimidine | Yellow |

I claim:

1. A process for bulk dyeing high molecular organic compounds characterized by employing anthrapyrimidines of the formula

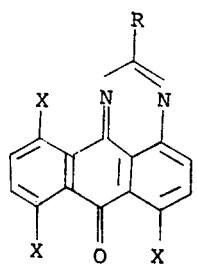

as the dyestuffs wherein R is an aromatic radical, one X is an arylamino group, and the remaining X groups are hydrogen atoms.

2. Process according to claim 1, wherein R is selected from benzene or naphthalene radicals, and X is an arylamino group which is at most tricyclic.

3. Process according to claim 1, characterised by the use of anthrapyrimidines of the formula II

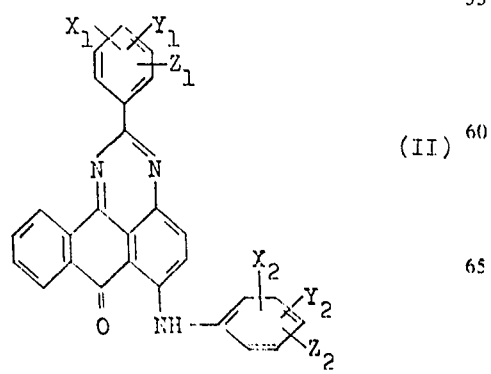

wherein $X_1$ denotes a hydrogen or halogen atom, an alkyl group containing 1–6 carbon atoms, or a phenyl or benzoyl group, $Y_1$ and $Z_1$ denote hydrogen or halogen atoms or alkyl groups containing 1–6 carbon atoms, $X_2$ denotes a hydrogen or halogen atom, an alkyl or alkoxy group, containing 1–6 carbon atoms, or a phenyl, phenylsulphonyl, phenoxy, phenylamino, benzoylamino or nitrile group, and $Y_2$ and $Z_2$ denote hydrogen or halogen atoms or alkyl groups containing 1–6 carbon atoms, or wherein the groups $X_2$ and $Y_2$ form a fused benzene ring.

4. Process according to claim 1, characterised by the use of anthrapyrimidines of the formula III

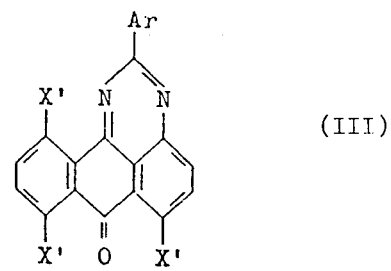

wherein Ar denotes an aryl radical, one X' denotes a group of the formula —NHA, wherein A represents an anthraquinoidal radical, and the remaining X' denote H atoms.

5. Process according to claim 3, characterised by the use of an anthrapyrimidine of the formula IIIa

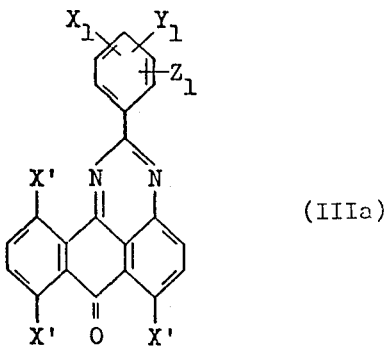

wherein one X' denotes a group of the formula —NHA, wherein A represents an anthraquinodial radical, and the remaining X' denote hydrogen atoms.

6. Process according to claim 5, characterised by the use of an anthrapyrimidine of the formula indicated in claim 8, wherein X' denotes a radical of the formula IIIb

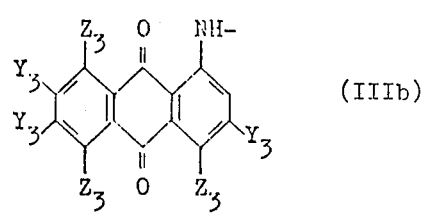

wherein one $Z_3$ denotes an alkanoylamino group containing 1–6 C atoms, or a benzoylamino group, and the other $Z_3$ denote H atoms, one $Y_3$ denotes an H or Cl atom and the other $Y_3$ denote H atoms.

* * * * *